United States Patent
König

[11] Patent Number: 5,127,698
[45] Date of Patent: Jul. 7, 1992

[54] SUPPORT BEARING

[75] Inventor: Werner König, Stuttgart, Fed. Rep. of Germany

[73] Assignee: Mercedes-Benz AG, Fed. Rep. of Germany

[21] Appl. No.: 674,118

[22] Filed: Mar. 25, 1991

[30] Foreign Application Priority Data

Apr. 12, 1990 [DE] Fed. Rep. of Germany ....... 4011827

[51] Int. Cl.$^5$ .......................................... B62D 23/00
[52] U.S. Cl. .................................. 296/35.1; 248/635
[58] Field of Search ..................... 296/35.1; 248/635; 267/141

[56] References Cited

U.S. PATENT DOCUMENTS

| 3,479,081 | 11/1969 | Schaaf. | |
|---|---|---|---|
| 3,990,737 | 11/1976 | Palmer | 296/35.1 |
| 4,014,588 | 3/1977 | Kohriyama | 296/35.1 |
| 4,286,777 | 9/1981 | Brown | 296/35.1 X |

FOREIGN PATENT DOCUMENTS 2122555 1/1984 United Kingdom.

Primary Examiner—Margaret A. Focarino
Assistant Examiner—Joseph D. Pape
Attorney, Agent, or Firm—Evenson, Wands, Edwards, Lenahan & McKeown

[57] ABSTRACT

An axially loadable support bearing for the elastic connection of vehicle parts has a rubber bush equipped with a metal bearing core and a sheet-metal casing provided with a flange. In the installation position of the support bearing, the flange is supported on one edge of a receiving lug receiving the bearing. The bead-like bush endpiece facing away from the flange engages behind the other edge of the receiving lug and has supporting elements which engage in a snap-like manner behind the edge of the receiving lug. An abutment is assigned in the bush endpiece at an axial distance from the edge of the receiving lug. A reliable bearing support in the receiving lug in each axial direction is achieved respectively by the flange and supporting elements.

14 Claims, 1 Drawing Sheet

SUPPORT BEARING

BACKGROUND AND SUMMARY OF THE INVENTION

The present invention relates to a support bearing for an elastic connection of vehicle parts, especially for securing a subframe to a vehicle body, in which, even under the influence of relatively high vibrations, the rubber bush in one vehicle part cannot shift in a receiving lug toward the other vehicle part.

Support bearings are shown in United Kingdom Preliminary Publication 2,122,555. In the installed state, the known rubber bush is subjected to shearing stresses. Also, for mounting the bearing in a vehicle part, the rubber bush has to be pressed with a tight fit into a corresponding receiving lug. To this end, the rubber bush is introduced into the receiving lug with its bead-like bush endpiece facing away from the flange of the sheet-metal casing, and the bush endpiece is correspondingly compressed in a radial direction.

When the rubber bush reaches its final installation position, the bead-like bush endpiece comes out of the receiving lug, expands in a radial direction, engages over the edge of the receiving lug and thus forms an axial stop which, together with the flange of the rubber bush bearing on the opposite edge of the receiving lug fixes the rubber bush in its installation position. This axial stop also forms a buffer for a stop plate which is arranged on the clamping screw passing through the bearing core and screwed to the other vehicle part to limit the axial travel of the support bearing in one direction.

In support bearings installed in subframes with their axis in the vertical direction, the rubber bush is exposed to especially high stresses in the axial direction. It is surprising that the flange and bead-like bush endpiece can perfectly well guarantee a reliable axial fixing of the rubber bush under pronounced vertical relative movements between the subframe and vehicle body, whereas the result of axially directed high-frequency vibrations can also be that the rubber bush, although mounted in the receiving lug with a high radial prestress, shifts axially. Thus, the stop formed by the bead-like bush endpiece engaging behind the edge of the receiving lug is thereby overcome, and the bush endpiece is drawn into the receiving lug. Consequently, the buffer provided between the receiving lug and the stop plate arranged on the clamping screw is then absent, and the bearing flexibility in one axial direction is correspondingly reduced. In the event of vertical movements between the vehicle body and subframe, therefore, the stop plate strikes directly against the subframe even after only a relatively small axial travel, thereby considerably restricting driving comfort.

In addition to the support bearing according to G.B. Preliminary Publication 2,122,555, which forms the starting point of the present invention, U.S. Pat. No. 3,479,081 has already made known a support bearing, the rubber bush of which likewise has supporting elements which prevent the possibility that the rubber bush will shift axially in the orifice receiving it. Here, the supporting elements form integral parts of a double-conical sleeve which constitutes the bearing core and the double cone of which is slotted along generatrices. The clamping screw passing through the sleeve is screwed into an internal sleeve thread.

As a result of the tightening of the clamping screw, the sleeve ribs formed by the slots buckle, the sleeve at the same time being shortened axially, and expand the rubber bush radially to such an extent that an axial movement in the orifices receiving it is no longer possible. The screwing of the clamping screw together with the sleeve does not make it possible to fix the bearing core to a vehicle part with a specific pressure force. moreover, in this bearing construction, it is not possible to equip the rubber bush with a sheet metal casing. Finally, this axial flexibility is dependent on the radial bracing of the rubber bush.

An object on which the present invention is based is to improve a support bearing such that, even under the influence of relatively high vibrations, the rubber bush can no longer shift in the receiving lug in the direction of the other vehicle part.

According to the present invention, this object has been achieved by providing the bush endpiece facing away from the flange with supporting elements which, after radial expansion, engage snap-like behind the edge of a receiving lug. At an axial distance from the edge of the receiving lug the supporting elements are adjacent to an abutment provided in the bush endpiece.

The supporting elements provided according to the present invention can be vulcanized onto or into the bush endpiece. They do not hinder the installation of the support bearing in a receiving lug because, when being pushed into the receiving lug, they are shifted appropriately far inward radially as a result of the associated radial deformation of the bush endpiece carrying them. When, after the installation position of the rubber bush is reached, the bush endpiece comes out of the receiving lug and then expands radially correspondingly as a result of its radial prestress previously obtained, the supporting elements are driven in this direction and shifted over the edge of the receiving lug.

There is then no possibility that the bush endpiece will be drawn into the receiving lug or that the rubber bush will shift axially in the lug, especially under the influence of axial vibrations since, under the influence of corresponding shearing forces, the supporting elements are supported on the abutment provided at an axial distance from the edge of the receiving lug, and an effective locking of the rubber bush is thereby maintained.

BRIEF DESCRIPTION OF THE DRAWINGS

These and other objects, features and advantages of the present invention will become more apparent from the following detailed description of a currently preferred embodiment when taken in conjunction with the accompanying drawings, wherein.

DETAILED DESCRIPTION OF THE DRAWINGS

Figure 1:
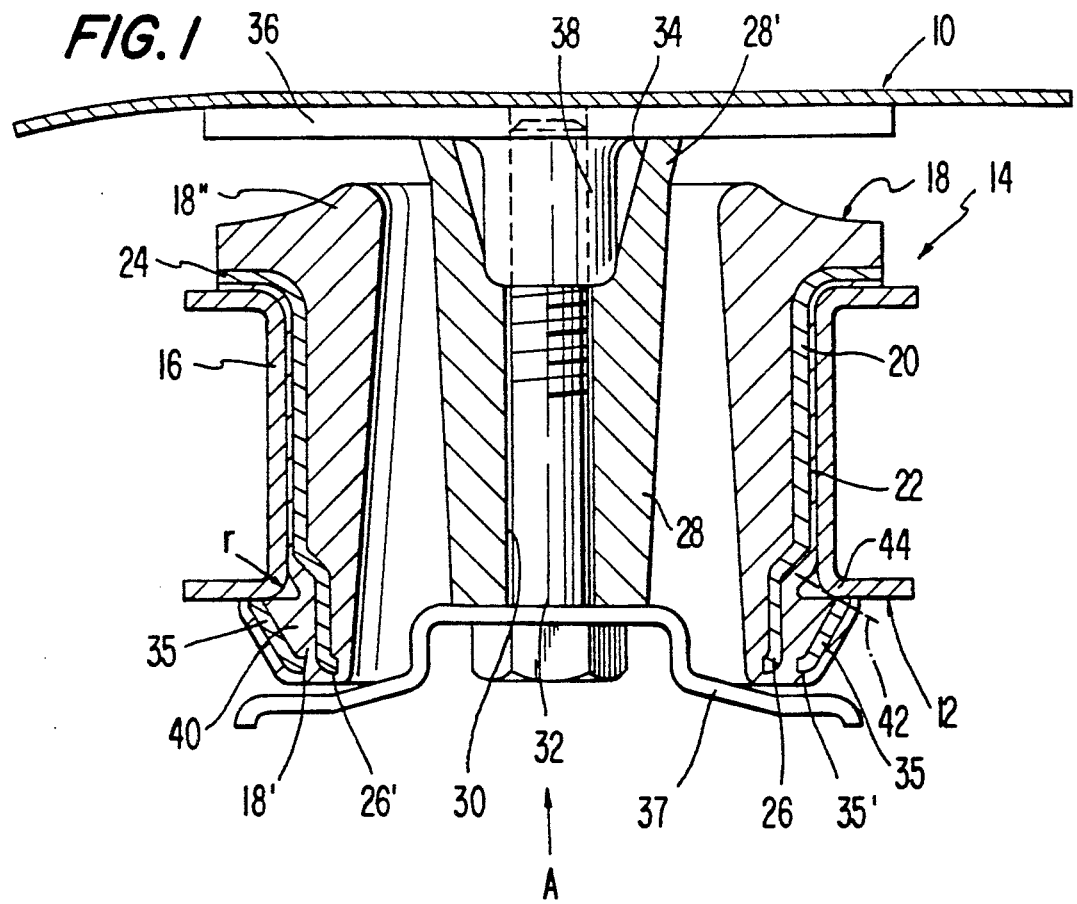
FIG. 1 is a longitudinal sectional view through a support bearing inserted into a subframe and screwed to a vehicle body in accordance with the present invention.

A portion of a vehicle body of a passenger car is designated generally by numeral 10 in FIG. 1 and a subframe secured elastically to the body 10 is designated generally by numeral 12. Securing of the frame 12 to the body 10 is carried out by support bearings 14 which operate as thrust bearings and are each pressed into a receiving lug 16 of the subframe 12.

The support bearings 14 have a rubber bush 18 with a sheet-metal casing 20 which is vulcanized-in such that the casing 20 is coated on the outer circumference with a thin rubber layer 22. The sheet metal casing 20 can, however, also be vulcanized onto the outer circumference of the rubber bush. A flange 24 is formed on one endpiece of the sheet-metal casing 20. The other endpiece of the casing 20 constitutes a cylindrical collar 26 of reduced diameter which extends into a bush endpiece 18' configured as an annular bead. Similarly, the other bush endpiece 18" also forms an annular bead which covers the flange 24 and constitutes a spring buffer.

A bearing core 28 projects with a plane endpiece 28' out of the annular bead 18" and is vulcanized in a conventional manner into connecting webs (not shown) of the rubber bush 18 which are diametrically opposite one another. A bore 30 passes axially through the bearing core 28 and receives a clamping screw 32 which projects with its shank end into a recess 34 accessible in the endpiece 28' of the bearing core 28 from its end face.

Dimensionally stable supporting elements 35 are vulcanized into the bush annular bead endpiece 18' and are distributed over the circumference of the bush endpiece 18'. Such elements can also be vulcanized onto the outer circumference of the bush endpiece 18'.

In the illustrated embodiment, the supporting elements 35 radially extend inward in the direction of the end face of the bush endpiece 18' and approach the collar 26 of the sheet-metal casing 20 as they terminate approximately in the plane of the collar end face 26'. As is clear from FIG. 1, in the installation position of the support bearing 14 in the subframe 12, the annular bead bush endpiece 18' engages behind the edge of the receiving lug 16, while the supporting elements 35 are likewise supported.

The flange 24 engages over the opposite edge of the receiving lug 16. Thus, the flange 24 and the bush endpiece 18' fix the installation position of the support bearing 14. The diameter of the sheet metal casing 20 is sized relative to the inside diameter of the receiving lug 16 so that the rubber bush 18 with its outer rubber layer 22 is press fit in the orifice 17 of the receiving lug 16.

At each of the points of connection of the subframe 12 to the vehicle body 10, a plate-shaped connection element 36 with a downwardly projecting collar 38 having an internal thread is provided on the body 10 to be brought into centering engagement with the recess 34 located in the end face of the bearing core 28. The clamping screw 32 carrying a stop plate 37 supported on the bearing core 28 is screwed into this internal thread, and the bearing core 28 and collar 38 are thereby blocked firmly relative to one another.

Alternatively, the bearing core 28 can also be brought to bear with a plane end face against a corresponding counterface of the connection element 36 and the clamping screw 32 be screwable, for example, into a collar attached to the topside of the connection element 36. For the purpose of mounting the support bearing 14, its rubber bush 18 together with the bush endpiece 18' is introduced into the receiving lug orifice 17, which is widened somewhat by an edge rounding during the pressing in of the rubber bush 18. The bush endpiece 18' is correspondingly reduced in diameter as a result of radial deformation.

Figure 2:
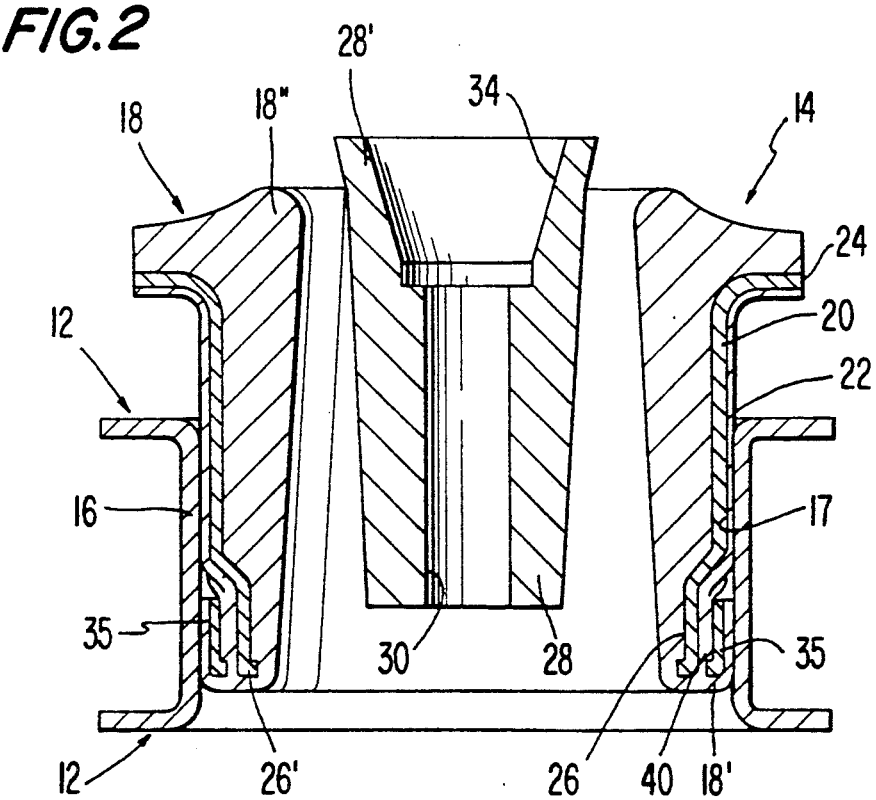
FIG. 2 is a longitudinal sectional view of the support bearing of FIG. 1, at the beginning of its mounting in a receiving lug of a subframe.

The outside diameter of the collar 26 is, at the same time, so reduced in relation to that of the remaining part of the sheet-metal casing 20 that, during this radial deformation, the supporting elements 35 can shift or pivot sufficiently far inwardly as seen in FIG. 2. When the bush endpiece 18' re-emerges from the orifice 17 of the receiving lug 16, it relaxes, expands radially correspondingly and engages behind the orifice edge as shown in FIG. 1. Thus, the rubber present between the supporting elements 35 and the collar 26 performing the function of an abutment acts as a return spring 40.

The arrangement of the supporting elements 35 is preferably such that, in their supporting position engaging behind the edge, they are perpendicular to a tangent 42 of an edge radius r of the orifice 17. Shearing forces exerted opposite to the pressing-in direction (as indicated by arrow A) or forces generated by vibrations cause the supporting elements 35 to be pivoted inward about their supporting point 44 and, with their endpiece 35' preferably angled in the direction of the collar 26, provide an abutment which prevents further yielding or deflection of the supporting elements 35.

Instead of the collar 26 in one piece with the sheet-metal casing 20, a metal ring vulcanized into the bush endpiece 18' can also advantageously be provided as an abutment. Instead of a plurality of supporting elements 35 provided at an angular distance from one another and preferably produced from sheet steel, only two essentially semicircular supporting elements can also advantageously be provided. In this latter alternative, one of the supporting elements could also perform the function of an abutment for the other, so that, if appropriate, there is no need to provide the collar 26 or a metal ring.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A support bearing for an elastic connection of vehicle parts, comprising a rubber bush having endpieces at each end thereof sized and configured to be insertably into a receiving lug on one vehicle part and to project therefrom, a metal bearing core and a sheet-metal casing vulcanized at the bush and supported by a flange on a side of the receiving lug facing another of the vehicle parts such that, as a result of radial expansion, the bush engages with the endpiece facing away from the flange and lug, and a clamping screw for bracing the bearing core with the other vehicle part, wherein the bead-like configuration bush endpiece facing away from the flange has separate and rigid supporting elements which, after radial expansion thereof, engage in a snap-like manner behind the edge of the receiving lug, and, at an axial distance from the edge of the receiving lug, the separate supporting elements being adjacent to an abutment provided in the bush endpiece facing away from the flange such that the rubber between the separate and rigid supporting elements and the abutment urges the separate and rigid supporting elements into the engaging position behind the edge of the receiving lug.

2. The support bearing according to claim 1, wherein, starting from the edge of the receiving lug, the supporting elements in the bush endpiece extend obliquely inward in the direction of the abutment.

3. The support bearing according to claim 1, wherein the abutment is formed by an annular casing vulcanized into the bush endpiece coaxially relative to a bush axis.

4. The support bearing according to claim 3, wherein, starting from the edge of the receiving lug, the supporting elements in the bush endpiece extend obliquely inward in the direction of the abutment.

5. The support bearing according to claim 3, wherein the annular casing is formed by a collar-like endpiece of reduced diameter of the sheet-metal casing, and the length of the supporting elements is smaller than the length of the collar-like endpiece of reduced diameter of the sheet-metal casing.

6. The support bearing according to claim 5, wherein, starting from the edge of the receiving lug, the supporting elements in the bush endpiece extend obliquely inward in the direction of the abutment.

7. The support bearing according to claim 1, wherein the supporting elements in their supporting position engaging behind the edge, are perpendicular to a tangent of an edge radius of the receiving lug.

8. The support bearing according to claim 7, wherein, starting from the edge of the receiving lug, the supporting elements in the bush endpiece extend obliquely inward in the direction of the abutment.

9. The support bearing according to claim 8, wherein the abutment is formed by an annular casing vulcanized into the bush endpiece coaxially relative to a bush axis.

10. The support bearing according to claim 9, wherein the annular casing is formed by a collar-like endpiece of reduced diameter of the sheet-metal casing, and the length of the supporting elements is smaller than the length of the collar-like endpiece of reduced diameter of the sheet metal casing.

11. The support bearing according to claim 3, wherein an endpiece of the supporting elements which faces away from the edge of the receiving lug is angled in the direction of one of the annular casing and of the endpiece of the sheet-metal casing.

12. The support bearing according to claim 11, wherein the annular casing is formed by a collar-like endpiece of reduced diameter of the sheet-metal casing, and the length of the supporting elements is smaller than the length of the collar like endpiece of reduced diameter of the sheet-metal casing.

13. The support bearing according to claim 12, wherein the supporting elements in their supporting position engaging behind the edge, are perpendicular to a tangent of an edge radius of the receiving lug.

14. The support bearing according to claim 1, wherein at least two essentially semi annular supporting elements are provided.

* * * * *